: 2,773,848
Patented Dec. 11, 1956

2,773,848

RESINOUS COMPOSITIONS

Richard Lindenfelser, Darien, Conn., assignor to American Cyanamid Company, New York, N. Y., a corporation of Maine No Drawing. Application December 21, 1953,
Serial No. 399,600

19 Claims. (Cl. 260—17.3)

This invention relates to modified aminoplastic resins. More particularly, this invention relates to modified aminoplastic resins possessing properties that render them useful in the plastics, coating, laminating and other arts, to products prepared therefrom, and to methods of producing such compositions and products.

The aminoplastic resinous compositions with which this invention is concerned comprise a modified aminoplastic resin, specifically a modified, heat-curable or heat-cured resinous product of reaction ingredients comprising (a) an aldehyde, e. g., formaldehyde and (b) a monomeric amidogen compound containing not less than two amidogen groupings, each having at least one hydrogen atom attached to the amidogen atom, e. g., urea, melamine, etc. I have found that an aminoplastic resinous composition of improved properties may be obtained by the modification of the resinous material with certain prescribed amounts of an alpha alkyl-D-glucoside wherein the alkyl radical contains from 1 to 4 carbon atoms, as will be set forth more fully hereinbelow.

Aminoplastic resinous compositions find many uses in the plastics, coating, and laminating fields. In many instances, modifiers have been added to the aminoplastic resin, thereby changing the ultimate properties of the cured material or the properties of the material during its cure. In some instances, improved plastic flow characteristics during the cure of the material are realized. Other modifiers have been utilized to improve dimensional stability, workability and other properties of the aminoplastic resin.

The aminoplastics are particularly useful in the production of decorative laminates to obtain therein maximum durability to abrasion, heat, light, solvents, and chemicals without detracting from the appearance of the printed sheet. The aminoplastics also insure a complete bond in the laminate and at the same time obtain resistance to discoloration due to heat and light. Aminoplastics employed at the present time have not been entirely satisfactory, however, inasmuch as the cured laminate has a tendency to bleed, i. e., a tendency for the resin material of the core assembly to migrate into the print sheet which produces discoloration on exposure to light. In an attempt to overcome this disadvantage in the prior art, an increased resin content in the print sheet has been utilized which is obviously uneconomical.

I have now found that when from about 1% to about 35% by weight based on the total weight of alpha alkyl-D-glucoside is employed as a modifier of an aminoplastic resin that a composition of improved properites may be obtained. The alkyl group in the glucoside may contain from 1 to 4 carbon atoms. Thus, such compounds as alpha methyl-D-glucoside, alpha ethyl-D-glucoside, alpha butyl-D-glucoside, and the like, find employment in the present invention. Prior to my invention various sugars such as sucrose, lactose, glucose, and the like, had been incorporated in the aminoplastic resins to modify the compositions. However, due to the many possible isomeric and tautomeric forms of these sugars, a composition possessing uniform properties could not be obtained in each instance. By the employment of an alpha alkyl-D-glucoside as practiced by my invention, wherein the lactol ring is definitely fixed, uniformly improved properties are thereby insured in the modified composition. Not only is the modifier utilized in my invention relatively inexpensive, it is also water-white and when incorporated into the aminoplastic resin yields a composition that is also water-while and has excellent color stability.

Aminoplastic resins, as is well known, are synthetic resins derived from amino (including imino) or amido (including imido) compounds, a typical example being melamine-formaldehyde resin. The present invention is concerned particularly with the modification of aminoplastics which are products of reaction of ingredients comprising an aldehyde, e. g., formaldehyde, and a monomeric amidogen compound containing not less than two (e. g., two, three, four or any number, but preferably only two or three) amidogen groupings each having at least one hydrogen atom, preferably two hydrogen atoms, attached to the amidogen nitrogen atom. Urea, melamine, substituted melamines, e. g., methylmelamine, and guanamines, e. g., acetoguanamines, are typical examples of amidogen compounds.

I prefer to use those amidogen aldehyde aminoplastics which are heat-curable or potentially heat-curable resinous reaction products of ingredients comprising a polyaminotriazine, e. g., melamine, and formeldehyde, or comprising urea, melamine, or other polyaminotriazine and formeldehyde. However, heat-curable or potentially heat-curable urea-formaldehyde, thiourea-formaldehyde and thiourea-melamine-formaldehyde resinous reaction products may also be employed. Dimethylol urea, alkyl ethers thereof, polymethylol melamines, and alkyl ethers thereof may be employed. Examples of other amidogen compounds which may be reacted with an aldehyde to provide the primary product which is modified in accordance with my invention are: methylurea, phenylurea, phenylthiourea, allylurea, guanylurea, guanylthiourea, dicyandiamide, guanadine, biguanide, diamonodiazines, guanazole and other diaminotriazoles, etc. In general, these amidogen aldehyde aminoplastics are prepared in accordance with techniques well known to the art. The molar ratio of aldehyde to amidogen compound, depending, for instance, upon the particular amidogen compound employed may vary from about 0.333 to 1.0 mol thereof for each aldehyde-reactable amidogen grouping in the amidogen compound, preferably from about 0.4 to about 0.667 mol per mol, respectively. The amidogen aldehyde reaction products obtained are water-soluble, e. g., water-dispersible, so that solutions theerof may be obtained.

Any suitable aldehyde may be utilized as a reactant with the amidogen compound in producing the aldehyde-reaction product thereof. I prefer to employ formaldehyde, e. g., an aqueous solution thereof. Paraformaldehyde, hexamethylenetetramine or other compounds engendering formaldehyde also may be employed. Other aldehydes, such as, for example, acetaldehyde, propionaldehyde, butyraldehyde, benzaldehyde, furfural, mixtures thereof or mixtures of formaldehyde with such other aldehydes or aldehyde may be employed. The properties desired in the finished product and economic considerations are among the factors which will determine the choice of the aldehyde employed.

The alpha alkyl-D-glucoside employed as the modifier in the present invention may be added to the aminoplastic resin at any time prior to the cure of the resinous material. Thus, the glucoside may be added to the resinous syrup to obtain a homogeneous mixture which may then be spray-dried in accordance with procedures well known in the art. The resinous syrup containing the modifier may also be dried in accordance with other procedures well known, such as vacuum-concentration, drum-drying, and the like. If desired, the resinous composition may be initially dried and the glucose then introduced into the composition as a dry blend. When preparing a molding composition, the modifier may be added with a suitable filler to the resinous syrup which is then homogeneously blended and dried to form the molding composition. It is preferred that from about 10% to about 30% of the alpha alkyl-D-glucoside be introduced into the composition wherein the percentage is based on the total weight. The resinous composition thereby obtained is water-dilutable and is comparable to an unmodified aminoplastic resin in this respect; whereas known modified aminoplastic resins usually required the presence of alcohol or other solvent in the system for dilution. The water-solubility of the composition obviously leads to easy cleaning of the treating equipment after it is used. While the modified composition is, prior to its cure, water-soluble or dilutable, when cured the aminoplastic has an increased water-resistance and also improved dimensional stability. Also, lesser amounts of the modified aminoplastic resin may be employed in certain laminating operations than was previously required when unmodified aminoplastics were used.

In order that those skilled in the art may more fully understand the inventive concept herein presented, the following illustrative examples are set forth. These examples should not be considered limitations unless so set forth in the appended claims. All parts are parts by weight.

EXAMPLE I

A urea-formaldehyde molding composition was prepared containing 1.33 mols of formaldehyde for each mol of urea. White pine wood flour was employed as the filler in the composition. Test pieces were molded at 310° F. and 3750 p. s. i. In order to set forth the improved properties of the resinous composition of my invention, modified urea-formaldehyde molding compositions are set forth in comparison to unmodified compositions. The results obtained employing 15% modifier are set forth below:

Table I

| Example | Modifier, percent by wt. | Filler, percent by wt. | FMF | FMS (inches) | |
|---|---|---|---|---|---|
| | | | | (15 sec.) | (30 sec.) |
| A | | 30 | 0.028 | 0.042 | 0.054 |
| B | 15 | 30 | 0.024 | 0.027 | 0.029 |

A melamine-formaldehyde resinous syrup was prepared by reacting 2 mols of formaldehyde for each mol of melamine. Alpha cellulose sheets of about 3 mil thickness were impregnated with the resinous syrup and dried to a volatile content of about 3.0–5.0%. A ⅛ inch laminate was then prepared and cured at 1100 p. s. i. and 150° C. for 15 minutes. In order to set forth the improved properties of the resinous composition of my invention, modified melamine-formaldehyde resins are set forth below in comparison with unmodified compositions.

Table II

| Example | Modifier, Percent by wt. | Mo. Ratio, M/F [1] | Percent H₂O Abs. (24 hr. soak) | Dimensional Stability [2] | | Heat Dist., °C. | Hot Hardness (Rockwell M) | Volatile, Percent | Flow, Percent |
|---|---|---|---|---|---|---|---|---|---|
| | | | | Perpendicular Machine Direction | Parallel Machine Direction | | | | |
| A | | ½ | 1.00 | 8.3 | 6.2 | 187 | 102–120 | 3.0–5.0 | 1.0–3.0 |
| B | 30 | ½ | 0.53 | 4.1 | 2.3 | 170 | 80.111 | 3.0–5.0 | 1.0–7.0 |
| C | 15 | ½ | 0.34 | 2.8 | 1.9 | 150 | 85–115 | 3.0–5.0 | |

[1] Melamine/Formaldehyde.
[2] Mils/in. after 48 hrs. at 105°.

The above examples were repeated employing as the modifier alpha ethyl-D-glucoside. Comparable improvements in such properties as flow of the resinous composition during its cure, dimensional stability of the cured laminate, etc. were realized.

Various fillers may be incorporated into the aminoplastic composition when it is desired to produce a molding composition. The fillers may be introduced into the resinous composition at any suitable stage of its manufacture and are such as alpha cellulose, wood flour, walnut shell flour, calcine or natural asbestos in the form of a powder or short or long fibers, finely-divided silicon carbide, carbon black, graphite, diatomaceous earth, slate dust, ground cuttings, e. g., cuttings of silk, rayon, nylon, or of cloth made from glass fibers, ground cork, etc. If desired, the filler and the aminoplastic resinous reaction product may first be compounded or blended together after which the alpha alkyl-D-glucoside modifier is incorporated therewith. The proportions of filler may be varied as desired or as conditions may require. Thus, for example, depending upon the particular filler employed and the intended use of the molded article, the filler may constitute, for example, from 5 to 80% by weight of the molded composition. Obviously, in certain applications no filler will be present.

In the production of laminates, the sheets are saturated with a solution or syrup of the resinous material. Inasmuch as the modified resinous composition of my invention is water soluble or dispersible, water may be used alone in preparing the solution for treatment of the laminating sheet. In certain instances it may be desirable to prepare a solution of the modified resinous composition in a water-acetone or water-alcohol solvent. Water soluble alcohols such as methylalcohol, ethylalcohol, isopropylalcohol, tertiarybutylalcohol and the like may be employed. The water-alcohol solution of the modified resinous composition is usually employed when the laminating sheets possess a minimum wet strength or when a sheet is employed which has a tendency to wrinkle or shrink when treated with a water solution of the resin. Usually no more than about 60% to about 70% by weight of the water-soluble alcohol or acetone is employed in the solution when it is present. The amount of the resin utilized in the solution will depend upon the particular type of sheet being treated, temperature of the solution, type of machine employed, etc. Generally a solution containing about 40% to about 50% resin solids is satisfactory. In some cases, however, it may be desirable to reduce the resin solids content of the solution to as low as about 20% and for other applications to as high as about 60%. The amount of the modified resinous composition employed in the production of the laminates may vary from about 30% to about 80% by weight based on the total weight of said laminate. Obviously the amount of the resin present in the laminate will vary depending upon the ultimate use of the product and also among other things upon the type of sheet being treated. A resin content between about 60% and 70% by weight is generally satisfactory. After the sheets are impregnated, they are then dried at elevated temperatures to a desired volatile content and the sheets are then assembled in multiples between molding press platens and cured at elevated temperatures and pressures to form laminated articles. In decorative laminates the overlay and the decorative sheets are both impregnated with the modified resin. In industrial laminates wherein the sheets are all of the same material all of the sheets may be treated with the modified resin. Sheets of fibrous materials, such as alpha cellulose, paper, glass cloth, or cloth formed of silk, cotton, wool, rayons or other synthetic fibers, may be employed in either the lamination production or in the overlay sheet.

Dyes, pigments and other colorants may be incorporated into the resinous compositions of my invention to alter the visual appearance and the optical properties of the finished product. In certain instances, curing agents such as phthalic anhydride, paratoluene sulfonic acid, phthalic acid, benzoyl peroxide, and the like, may also be incorporated into the aminoplastics. Mold lubricants may also be incorporated into the compositions if needed to facilitate molding of the heat-curable convertible compositions. Examples of suitable mold lubricants are zinc stearate, calcium stearate, glyceroyl monostearate, and the like. The additives herein discussed may be mixed with either the resinous composition or the modifier before they are admixed with each other, or the components may be compounded or blended simultaneously. It is obvious that agents producing special effects may also be incorporated into the resinous compositions as desired or as conditions may require.

I claim:

1. A composition of matter comprising a thermosetting product of reaction of ingredients comprising (a) an aldehyde and (b) a monomeric amidogen compound containing not less than two amidogen groupings each having at least one hydrogen atom attached to the amidogen nitrogen atom, said reaction product being modified with alpha alkyl-D-glucoside wherein the alkyl group contains from 1 to 4 carbon atoms and said glucoside being present in an amount varying between about 10% to about 30% by weight based on the total weight of said reaction product.

2. A composition of matter comprising a thermosetting product of reaction of ingredients comprising (a) formaldehyde and (b) a monomeric amidogen compound containing not less than two amidogen groupings each having at least one hydrogen atom attached to the amidogen nitrogen atom, said reaction product being modified with alpha alkyl-D-glucoside wherein the alkyl group contains from 1 to 4 carbon atoms and said glucoside being present in an amount varying between about 10% to about 30% by weight based on the total weight of said reaction product.

3. A composition of matter comprising a product of reaction of ingredients comprising (a) formaldehyde and (b) urea, said reaction product being modified with an alpha alkyl-D-glucoside wherein the alkyl group contains from 1 to 4 carbon atoms and said glucoside being present in an amount varying between about 10% to about 30% by weight based on the total weight of said reaction product.

4. A composition of matter comprising a product of reaction of ingredients comprising (a) formaldehyde and (b) melamine, said reaction product being modified with an alpha alkyl-D-glucoside wherein the alkyl group contains from 1 to 4 carbon atoms and said glucoside being present in an amount varying between about 10% to about 30% by weight based on the total weight of said reaction product.

5. A composition of matter comprising a product of reaction of ingredients comprising (a) formaldehyde and (b) urea, said reaction product being modified with alpha methyl-D-glucoside and said glucoside being present in an amount varying between about 10% to about 30% by weight based on the total weight of said reaction product.

6. A composition of matter comprising a product of reaction of ingredients comprising (a) formaldehyde and (b) urea, said reaction product being modified with alpha ethyl-D-glucoside and said glucoside being present in an amount varying between about 10% to about 30% by weight based on the total weight of said reaction product.

7. A composition of matter comprising a product of reaction of ingredients comprising (a) formaldehyde and (b) melamine, said reaction product being modified with alpha methyl-D-glucoside and said glucoside being present in an amount varying between about 10% to about 30% by weight based on the total weight of said reaction product.

8. A composition of matter comprising a product of reaction of ingredients comprising (a) formaldehyde and (b) melamine, said reaction product being modified with alpha ethyl-D-glucoside and said glucoside being present in an amount varying between about 10% to about 30% by weight based on the total weight of said reaction product.

9. A composition of matter comprising a thermosetting product of reaction of ingredients comprising (a) an aldehyde and (b) a monomeric amidogen compound containing not less than two amidogen groupings each having at least one hydrogen atom attached to the amidogen nitrogen atom, said reaction product being modified with alpha alkyl-D-glucoside wherein the alkyl group contains from 1 to 4 carbon atoms and said glucoside being present in an amount varying between about 1% to about 35% by weight based on the total weight.

10. A heat-hardenable thermosetting molding composition comprising a dry, physical mixture of (1) a filler, (2) a heat-curable product of reaction of ingredients comprising (a) formaldehyde and (b) a monomeric amidogen compound containing not less than two amidogen groupings each having at least one hydrogen atom attached to the amidogen nitrogen atom and (3) an alpha alkyl-D-glucoside wherein the alkyl group contains from 1 to 4 carbon atoms and said glucoside being present in an amount varying between about 10% to about 30% by weight based on the total weight of said reaction product.

11. A product comprising the cured composition of claim 10.

12. A heat-hardenable molding composition comprising (1) a filler, (2) a heat-curable product of reaction of ingredients comprising (a) formaldehyde and (b) melamine and (3) an alpha alkyl-D-glucoside wherein the alkyl group contains from 1 to 4 carbon atoms and said glucoside being present in an amount varying between about 10% to about 30% by weight based on the total weight of said reaction product.

13. A heat-hardenable molding composition comprising (1) a filler, (2) a heat-curable product of reaction of ingredients comprising (a) formaldehyde and (b) melamine and (3) alpha methyl-D-glucoside and said glucoside being present in an amount varying between about 10% to about 30% by weight based on the total weight of said reaction product.

14. A heat-hardenable molding composition comprising (1) a filler, (2) a heat-curable product of reaction of ingredients comprising (a) formaldehyde and (b) melamine and (3) alpha ethyl-D-glucoside and said glucoside being present in an amount varying between about 10% to about 30% by weight based on the total weight of said reaction product.

15. A heat-hardenable molding composition comprising (1) a filler, (2) a heat-curable product of reaction of ingredients comprising (a) formaldehyde and (b) urea and (3) an alpha alkyl-D-glucoside wherein the alkyl group contains from 1 to 4 carbon atoms and said glucoside being present in an amount varying between about 10% to about 30% by weight based on the total weight of said reaction product.

16. A heat-hardenable molding composition comprising (1) a filler, (2) a heat-curable product of reaction of ingredients comprising (a) formaldehyde and (b) urea and (3) alpha methyl-D-glucoside and said glucoside being present in an amount varying between about 10% to about 30% by weight based on the total weight of said reaction product.

17. A heat-hardenable molding composition comprising (1) a filler, (2) a heat-curable product of reaction of ingredients comprising (a) formaldehyde and (b) urea and (3) alpha ethyl-D-glucoside and said glucoside being present in an amount varying between about 10% to about 30% by weight based on the total weight of said reaction product.

18. A liquid thermosetting composition suitable for making laminates comprising a solution containing (1) a water-soluble, thermosetting product of reaction of ingredients comprising (a) formaldehyde and (b) a monomeric amidogen compound containing not less than two amidogen groupings each having at least one hydrogen atom attached to the amidogen nitrogen atom and (2) an alpha alkyl-D-glucoside wherein the alkyl group contains from 1 to 4 carbon atoms, and said glucoside being present in the said solution in an amount varying between about 1% to about 35% by weight based on the total weight, the percentages being calculated on a dry basis.

19. A composition of matter comprising a product of reaction of ingredients comprising (a) formaldehyde and (b) melamine, said reaction product being modified with from about 1% to about 35% by weight based on the total weight of alpha methyl-D-glucoside.

References Cited in the file of this patent
UNITED STATES PATENTS

| | | |
|---|---|---|
| 2,355,245 | Schreiber et al. | Aug. 8, 1944 |
| 2,512,672 | Novotny et al. | June 27, 1950 |
| 2,515,170 | Cassel | July 18, 1950 |
| 2,584,177 | Wohnsiedler et al. | Feb. 5, 1952 |